(12) United States Patent
Sopko et al.

(10) Patent No.: US 6,788,022 B2
(45) Date of Patent: Sep. 7, 2004

(54) ELECTRIC MOTOR

(75) Inventors: Jeffrey Raymond Sopko, Troy, OH (US); Jackie Earl Woody, Troy, OH (US)

(73) Assignee: A. O. Smith Corporation, Milwaukee, WI (US)

( * ) Notice: Subject to any disclaimer, the term of this patent is extended or adjusted under 35 U.S.C. 154(b) by 95 days.

(21) Appl. No.: 10/277,059

(22) Filed: Oct. 21, 2002

(65) Prior Publication Data

US 2004/0075415 A1 Apr. 22, 2004

(51) Int. Cl.[7] .................................................. H02K 17/36
(52) U.S. Cl. .................................... 318/772; 310/112
(58) Field of Search ............................... 318/767, 772, 318/781; 310/112

(56) References Cited

U.S. PATENT DOCUMENTS 2,796,571 A  *  6/1957  Dunn ........................... 318/722
5,838,135 A  * 11/1998  Satake et al. ................. 318/771
6,034,456 A  *  3/2000  Osama et al. ................ 310/90.5

* cited by examiner

*Primary Examiner*—Bentsu Ro
(74) *Attorney, Agent, or Firm*—Michael Best & Friedrich LLP

(57) ABSTRACT

An electric motor controllable to operate at a number of distinct output speeds. The electric motor includes a single set of mechanical parts in combination with a multiple sets of electromagnetic parts having different configurations, where the number of electromagnetic parts corresponds to the number of distinct output speeds of the electric motor.

47 Claims, 3 Drawing Sheets

ELECTRIC MOTOR

BACKGROUND OF THE INVENTION

The present invention relates to electric motors, and more particularly to electric motors controllable to operate at a number of distinct output speeds.

Various electric motor controls have been used to control various electric motors to operate at multiple output speeds. Nevertheless, it would be desirable to have a new electric motor that is controllable by a less expensive controller to provide efficient operation at a number of distinct speeds.

SUMMARY OF THE INVENTION

Accordingly, the invention provides an electric motor that is controllable by an inexpensive controller to independently provide efficient operation at a number of distinct output speeds. The electric motor includes a single set of mechanical parts (e.g., housing, shaft, bearings, etc.) in combination with multiple sets of electromagnetic parts (e.g., first and second stators adapted to independently receive power from the controller and thereby produce first and second magnetic fields, respectively, and first and second rotating members connected to the shaft for rotation therewith and adapted to interact with the first and second magnetic fields), where the number of electromagnetic parts corresponds to the number of distinct output speeds of the electric motor. In some embodiments, each set of electromagnetic parts has a different configuration (e.g., a low speed set, a high speed set, etc.).

In one embodiment, the electric motor independently provides either a first or a second output speed. The motor includes two sets of electromagnetic parts (i.e., a first stator and a first rotating member, and a second stator and a second rotating member). The controller independently provides the electric motor either a first or a second power, where the first power corresponds to the first speed and the second power corresponds to the second speed. When the first power is provided, the first stator receives the first power and produces a first magnetic field. The first rotating member interacts with the first magnetic field and, as a result of the interaction, the rotor rotates at the first output speed. Similarly, when the second power is provided, the second stator receives the second power and produces a second magnetic field. The second rotating member interacts with the second magnetic field and, as a result of the interaction, the rotor rotates at the second output speed.

The electric motor of the invention can be used in many different environments requiring low numbers (e.g., 2, 3) of distinct output speeds. For example, the electric motor can be incorporated in a heating, ventilation, and air conditioning (HVAC) system to drive a blower assembly at either the first speed or the second speed. The first and second speeds provide a first or a second volume of air, respectively, to the environment the HVAC system is conditioning.

In other embodiment, the electric motor provides a different number of output speeds and/or is incorporated in other systems.

Other features of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," and "coupled" are used broadly and encompass both direct and indirect mountings, connections, and. Further, "connected" and "coupled" are not restricted to physical or mechanical connections or couplings.

Figure 1:
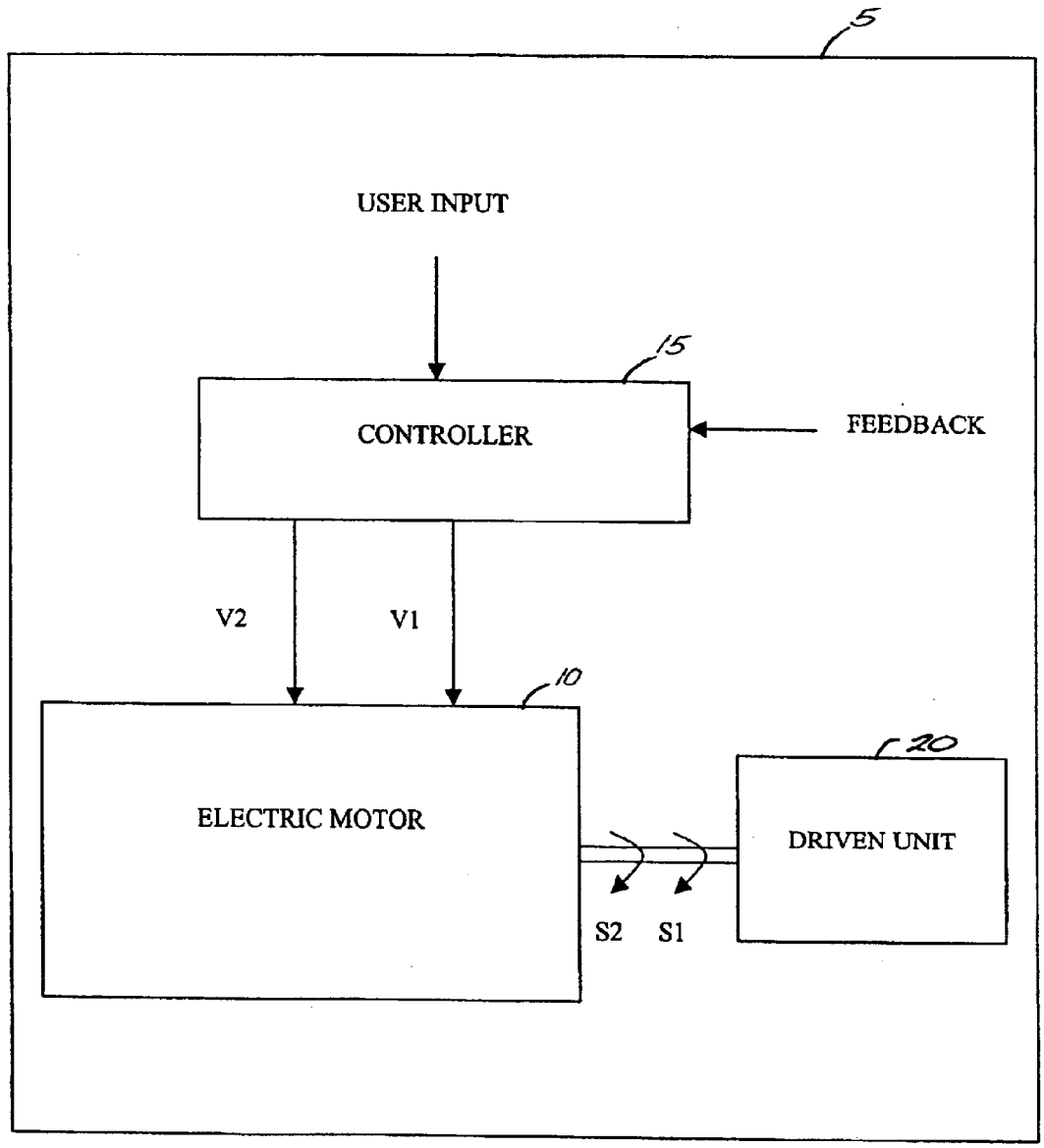
FIG. 1 is a schematic diagram of a HVAC system incorporating an electric motor of the present invention.

FIG. 1 schematically illustrates an HVAC system 5 having an electric motor 10 of the invention. The electric motor 10 is electrically coupled to a controller 15 and drivingly coupled to a driven unit 20. As described herein, the HVAC system 5 is a dual capacity heating and cooling system, the functionality of the controller 10 is incorporated in the controls of the HVAC system 5, and the driven unit 20 is a blower assembly which delivers either a first or a second volume of air to the environment conditioned by the HVAC system 5. The controller 15 independently provides either a first power V1 (e.g., an alternating current (AC) power, a direct current (DC) power, etc.) or a second power V2 (e.g., an AC power, a DC power, etc.) to the motor 10 based on a user input (e.g., an adjustment of a thermostat associated with the HVAC system 5) and/or a feedback (e.g., a trigger resulting from a failure to reach a commanded temperature in the environment conditioned by the HVAC system in a set amount of time). As described further below, supplying the first power V1 to the motor 10 results in a first output motor speed S1, and supplying the second power V2 to the motor 10 results in a second output motor speed S2. When the blower assembly 20 is driven at the first output speed S1, the first volume of air is provided to the environment, and when the blower assembly 20 is driven at the second output speed S2, the second volume of air is provided to the environment. The motor 10 is capable of use in other systems and the HVAC system 5 is shown and described as an example of one such system.

As used herein, the first and second output speeds S1 and S2, respectively, may include a range of output speeds. Description of the output speeds S1 and S2 as distinct output speeds refers to the generally unvaried supply of the first and second powers V1 and V2 which are utilized to generate the first and second output speeds S1 and S2. Although the output speeds S1 and S2 may vary based on characteristics of the motor 10 and/or loads applied to the motor 10, the speeds S1 and S2 generally will not vary based on the control provided by the controller 15. In one embodiment, the first output speed S1 is a low speed (e.g., 550 revolutions per minute (RPM)) and the second output speed S2 is a high speed (e.g., 1075 RPM).

Figure 2:
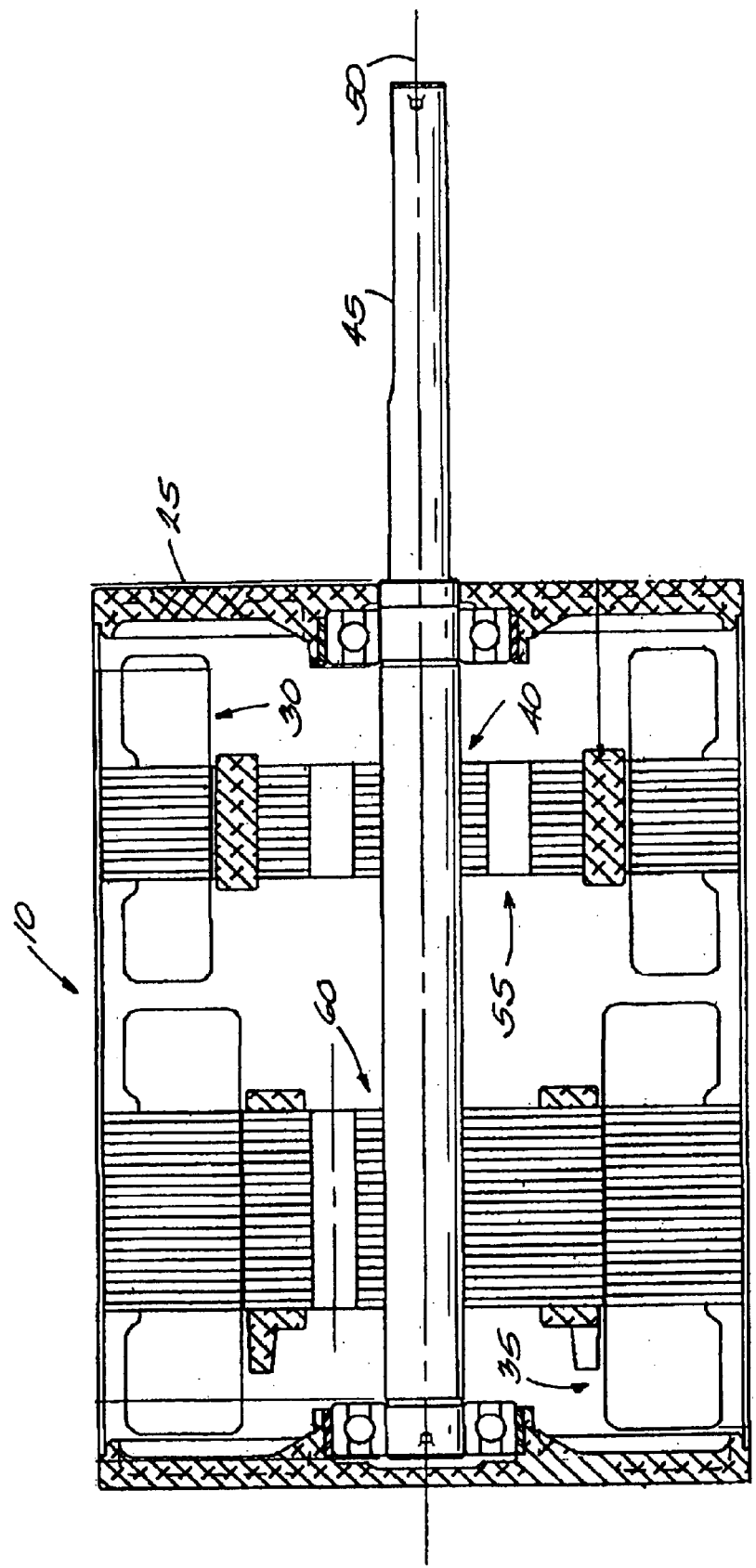
FIG. 2 is a sectional view of the electric motor shown in FIG. 1.

As shown in FIG. 2, the motor 10 includes a housing 25, a first stator 30 fixed relative to the housing 25, a second stator 35 fixed relative to the housing 25, and a rotor 40. The rotor 40 includes a shaft 45 rotatable relative to the housing 25 about an axis 50, a first rotating member 55 connected to the shaft 40 for rotation therewith relative to the first stator 30, and a second rotating member 60 connected to the shaft 45 for rotation therewith relative to the second stator 35.

Figure 3:
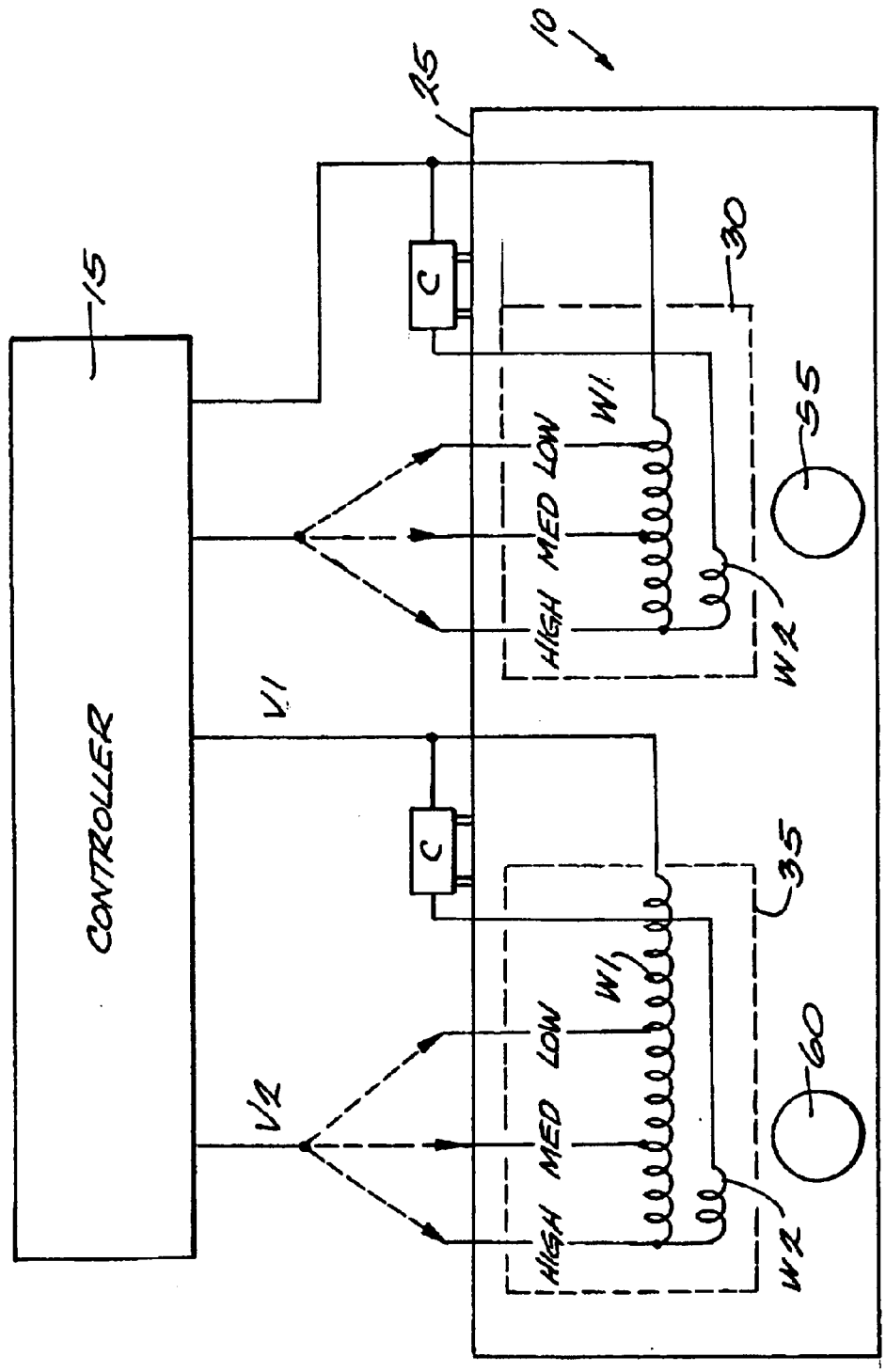
FIG. 3 is a schematic diagram of the electric motor shown in FIG. 1 and a controller connected to the motor.

The first and second stators 30 and 35, respectively, are independently electrically coupled to the controller 15 to receive power. In one embodiment, as shown in FIG. 3, the first stator 30 receives the first power V1 and the second stator 35 receives the second power V2. When the first stator 30 receives the first power V1, the first stator 30 produces a first magnetic field, and when the second stator 35 receives the second power V2, the second stator 35 produces a second magnetic field. The first rotating member 55 interacts with the first magnetic field to produce a first torque in the rotor 40 causing the rotor 40 to rotate at the first output speed S1. The second rotating member 60 interacts with the second magnetic field to produce a second torque in the rotor 40 causing the rotor 40 to rotate at the second output speed S2.

As shown in FIG. 3, in one embodiment, the motor 10 includes a permanent split capacitor induction motor. Each stator 30 and 35 includes a main winding W1 and a starting or an auxiliary winding W2. Each auxiliary winding W2 is connected in series with a capacitor C for startup and normal operation of the motor 10. The first and second rotating members 55 and 60, respectively, include a laminated core, conductor bars running parallel to the axis 50, and conducting rings located on the longitudinal ends of each rotating member 55 and 60 and electrically coupled to the conductor bars.

As the first power V1 (e.g., a first AC power) is passed through the windings W1 and W2 of the first stator 30, a moving magnetic field (i.e., the first magnetic field) is formed near the energized stator 30. The moving magnetic field induces a current in the first rotating member 55, thereby forming a magnetic field near the first rotating member 55. Interaction between the field of the first stator 30 and the field of the first rotating member 55 produces a torque on the rotor 40 which causes the rotor 40 to rotate at the first output speed S1. Similarly, supply of the second power V2 to the windings W1 and W2 of the second stator 35 results in the rotor 40 rotating at the second output speed S2. In one specific embodiment, the first and second powers V1 and V2, respectively, are electrically the same.

In other embodiments, the motor 10 includes other types of motors (e.g., AC motors, DC motors, brush motors, brushless motors, etc.) and other types of induction motors (e.g., split-phase, capacitor start/induction run, capacitor start/capacitor run, shaded-pole, etc.).

In the illustrated embodiment, the first and second stators 30 and 35, respectively, each include a standard speed connection HIGH and two alternative speed connections MED and LOW. In other embodiments, the first and second stators 30 and 35 may each independently include different numbers of alternate speed connections (e.g., the first stator 30 includes a standard speed connection and no alternate speed connections, and the second stator 35 includes a standard speed connection and three alternate speed connections). Alternative speed connections are commonly known as taps. The alternative speed connections allow the individual installing the HVAC system 5 to adjust the first and second speeds S1 and S2 to fit the particular installation. Variation in equipment and ductwork design changes the first and second volumes of air needed to optimally condition the environment of the HVAC system. Utilization of the alternative speed connections provides flexibility in the installation process. In other embodiments, the first and second stators 30 and 35 may include multiple sets of main windings W1 and/or auxiliary windings W2 for adjusting the output speeds S1 and S2.

In the illustrated embodiment, the first stator 30 includes ten poles and the second stator 35 includes six poles. In other embodiments, the stator configurations can vary. Further, the first stator 30 and the first rotating member 55 form a low speed, high efficiency set of electromagnetic parts and the second stator 35 and the second rotating member 60 form a high speed, high efficiency set of electromagnetic parts. Utilization of such sets allows for efficient operation at each of the distinct output speeds.

In one embodiment, the controller 15 is implemented using a programmable device (e.g., a microprocessor, a microcontroller, a digital signal processor (DSP), etc.) that utilizes software stored in a memory and a discrete power component (e.g., a switch such as a relay, etc.). In other embodiments, the controller 15 may be implemented using other combinations of software and hardware or using solely software or hardware.

Based on a user input and/or a feedback, the controller 15 provides either the first power V1 or the second power V2 to the motor 10. In one embodiment, the first and second powers V1 and V2 are both 115 volt/60 Hz power. In other embodiments, the first and second powers V1 and V2 include other powers (e.g., 230 volts/60 Hz AC power, etc.).

Various features of the invention are set forth in the following claims.

What is claimed is:

1. An electric motor controllable by a controller, the controller configured to provide a first power or a second power, the electric motor comprising:

a housing;

a first stator fixed relative to the housing and adapted to receive the first power, the first stator producing a first magnetic field when the first stator receives the first power, wherein the first stator includes a first number of poles;

a second stator fixed relative to the housing and adapted to receive the second power, the second stator producing a second magnetic field when the second stator receives the second power, wherein the second stator includes a second number of poles, and wherein the first number is greater than the second number; and a rotor including a shaft rotatable relative to the housing, a first rotating member connected to the shaft for rotation therewith and adapted to interact with the first magnetic field, and a second rotating member connected to the shaft for rotation therewith and adapted to interact with the second magnetic field, the rotor rotating at a first speed when the first magnetic field interacts with the first rotating member and rotating at a second speed when the second magnetic field interacts with the second rotating member.

2. The electric motor of claim 1, wherein the housing defines an interior, and wherein the first and second stators are disposed in the interior.

3. The electric motor of claim 1, wherein the electric motor is an induction motor.

4. The electric motor of claim 1, wherein the electric motor is a permanent-split capacitor induction motor.

5. The electric motor of claim 1, wherein the first stator and the first rotating member include a low speed stator and rotating member set, and wherein the second stator and the second rotating member include an efficient high speed stator and rotating member set.

6. An electric motor controllable by a controller, the controller configured to provide a first power or a second power, the electric motor comprising:
   a housing;
   a first stator fixed relative to the housing and adapted to receive the first power, the first stator producing a first magnetic field when the first stator receives the first power, wherein the first stator includes a standard speed connection and at least one alternative speed connection;
   a second stator fixed relative to the housing and adapted to receive the second power, the second stator producing a second magnetic field when the second stator receives the second power; and
   a rotor including a shaft rotatable relative to the housing, a first rotating member connected to the shaft for rotation therewith and adapted to interact with the first magnetic field, and a second rotating member connected to the shaft for rotation therewith and adapted to interact with the second magnetic field, the rotor rotating at a first speed when the first magnetic field interacts with the first rotating member and rotating at a second speed when the second magnetic field interacts with the second rotating member.

7. The electric motor of claim 6, wherein the standard speed connection includes a high speed connection and the at least one alternative speed connection includes one of a medium speed connection and a low speed connection.

8. The electric motor of claim 6, wherein the housing defines an interior, and wherein the first and second stators are disposed in the interior.

9. The electric motor of claim 6, wherein the electric motor is an induction motor.

10. The electric motor of claim 6, wherein the electric motor is a permanent-split capacitor induction motor.

11. The electric motor of claim 6, wherein the first stator includes a first number of poles, and wherein the second stator includes a second number of poles, and wherein the first number is greater than the second number.

12. The electric motor of claim 6, wherein the first stator and the first rotating member include a low speed stator and rotating member set, and wherein the second stator and the second rotating member include an efficient high speed stator and rotating member set.

13. A heating, ventilation, and air conditioning (HVAC) system comprising:
   an electric motor controllable to operate in a first mode or a second mode, the electric motor including
      a housing,
      a first stator fixed relative to the housing, wherein the first stator includes a standard speed connection and at least one alternative speed connection,
      a second stator fixed relative to the housing, and
      a rotor having a shaft rotatable relative to the housing, a first rotating member connected to the shaft for rotation therewith relative to the first stator, and a second rotating member connected to the shaft for rotation therewith relative to the second stator;
   a controller operable to independently provide a first power to the first stator to energize the first stator in the first mode and to independently provide a second power to the second stator to energize the second stator in the second mode; and
   a blower assembly drivingly coupled to the shaft.

14. A heating, ventilation, and air conditioning (HVAC) system comprising:
   a controller configured to provide a first power and a second power;
   an electric motor electrically coupled to and controllable by the controller, the electric motor including
      a housing,
      a first stator fixed relative to the housing and adapted to receive the first power, the first stator producing a first magnetic field when the first stator receives the first power, wherein the first stator includes a first number of poles,
      a second stator fixed relative to the housing and adapted to receive the second power, the second stator producing a second magnetic field when the second stator receives the second power, wherein the second stator includes a second number of poles, and wherein the first number is greater than the second number, and
      a rotor including a shaft rotatable relative to the housing, a first rotating member connected to the shaft for rotation therewith and adapted to interact with the first magnetic field, and a second rotating member connected to the shaft for rotation therewith and adapted to interact with the second magnetic field, the rotor rotating at a first speed when the first magnetic field interacts with the first rotating member and rotating at a second speed when the second magnetic field interacts with the second rotating member; and
   a blower assembly drivingly coupled to the shaft to move a first volume of air per minute when driven at the first output speed and a second volume of air per minute when driven at the second output speed, the first and second volumes of air being different.

15. The HVAC system of claim 14, wherein the first stator includes a standard speed connection and at least one alternative speed connection.

16. The HVAC system of claim 15, wherein the standard speed connection includes a high speed connection and the at least one alternative speed connection includes one of a medium speed connection and a low speed connection.

17. An electric motor controllable by a controller, the controller configured to provide a first power or a second power, the electric motor comprising:
   a housing;
   a first stator fixed relative to the housing and adapted to receive the first power, the first stator producing a first magnetic field when the first stator receives the first power, the first stator comprising a first speed connection and a second speed connection, the second speed connection being different than the first speed connection;
   a second stator fixed relative to the housing and adapted to receive the second power, the second stator producing a second magnetic field when the second stator receives the second power; and
   a rotor including a shaft rotatable relative to the housing, a first rotating member connected to the shaft for rotation therewith and adapted to interact with the first magnetic field, and a second rotating member connected to the shaft for rotation therewith and adapted to interact with the second magnetic field, the rotor rotating at a first speed when the first magnetic field interacts with the first rotating member and rotating at a second speed when the second magnetic field interacts with the second rotating member.

18. The electric motor of claim 17, wherein the housing defines an interior, and wherein the first and second stators are disposed in the interior.

19. The electric motor of claim 17, wherein the electric motor is an induction motor.

20. The electric motor of claim 17, wherein the electric motor is a permanent-split capacitor induction motor.

21. The electric motor of claim 17, wherein the first stator includes a first number of poles, and wherein the second stator includes a second number of poles, and wherein the first number is greater than the second number.

22. The electric motor of claim 17, wherein the first speed connection comprises a standard speed connection and the second speed connection comprises an alternative speed connection.

23. The electric motor of claim 22, wherein the standard speed connection includes a high speed connection and the alternative speed connection includes one of a medium speed connection and a low speed connection.

24. The electric motor of claim 17, wherein the first stator and the first rotating member include a low speed stator and rotating member set, and wherein the second stator and the second rotating member include an efficient high speed stator and rotating member set.

25. A heating, ventilation, and air conditioning (HVAC) system comprising:
   an electric motor controllable to operate in a first mode or a second mode, the electric motor including
      a housing,
      a first stator fixed relative to the housing, wherein the first stator includes a first number of poles,
      a second stator fixed relative to the housing, wherein the second stator includes a second number of poles, and wherein the first number is greater than the second number, and
      a rotor having a shaft rotatable relative to the housing, a first rotating member connected to the shaft for rotation therewith relative to the first stator, and a second rotating member connected to the shaft for rotation therewith relative to the second stator;
   a controller operable to independently provide a first power to the first stator to energize the first stator in the first mode and to independently provide a second power to the second stator to energize the second stator in the second mode; and
   a blower assembly drivingly coupled to the shaft.

26. The HVAC system of claim 25, wherein the first stator produces a first magnetic field when energized.

27. The HVAC system of claim 26, wherein the first rotating member interacts with the first magnetic field, and wherein the rotor rotates at a first speed when the first rotating member interacts with the first magnetic field.

28. The HVAC system of claim 27, wherein the HVAC system includes a dual capacity heating and cooling system, wherein the second stator produces a second magnetic field when energized, wherein the second rotating member interacts with the second magnetic field, wherein the rotor rotates at a second speed when the second rotating member interacts with the second magnetic field, wherein the blower assembly moves a first volume of air when driven at the first speed, and wherein the blower assembly moves a second volume of air when driven at the second speed.

29. The HVAC system of claim 25, wherein the controller is electrically coupled to the first stator and the second stator.

30. The HVAC system of claim 25, wherein the controller independently energizes the first and second stators in response to a user input.

31. The HVAC system of claim 25, wherein the controller independently energizes the first and second stators in response to a feedback.

32. The HVAC system of claim 25, wherein the electric motor is an induction motor.

33. The HVAC system of claim 25, wherein the electric motor drives the blower assembly to move a first volume of air per minute in the first mode and a second volume of air per minute in the second mode, and wherein the first and second volumes of air are different.

34. A heating, ventilation, and air conditioning (HVAC) system comprising:
   an electric motor controllable to operate in a first mode or a second mode, the electric motor including
      a housing,
      a first stator fixed relative to the housing, the first stator comprising a first speed connection and a second speed connection, the second speed connection being different than the first speed connection, and
      a second stator fixed relative to the housing, and
      a rotor having a shaft rotatable relative to the housing, a first rotating member connected to the shaft for rotation therewith relative to the first stator, and a second rotating member connected to the shaft for rotation therewith relative to the second stator;
   a controller operable to independently provide a first power to the first stator to energize the first stator in the first mode and to independently provide a second power to the second stator to energize the second stator in the second mode; and
   a blower assembly drivingly coupled to the shaft.

35. The HVAC system of claim 34, wherein the first stator produces a first magnetic field when energized.

36. The HVAC system of claim 35, wherein the first rotating member interacts with the first magnetic field, and wherein the rotor rotates at a first speed when the first rotating member interacts with the first magnetic field.

37. The HVAC system of claim 36, wherein the HVAC system includes a dual capacity heating and cooling system, wherein the second stator produces a second magnetic field when energized, wherein the second rotating member interacts with the second magnetic field, wherein the rotor rotates at a second speed when the second rotating member interacts with the second magnetic field, wherein the blower assembly moves a first volume of air when driven at the first speed, and wherein the blower assembly moves a second volume of air when driven at the second speed.

38. The HVAC system of claim 34, wherein the controller is electrically coupled to the first stator and the second stator.

39. The HVAC system of claim 34, wherein the controller independently energizes the first and second stators in response to a user input.

40. The HVAC system of claim 34, wherein the controller independently energizes the first and second stators in response to a feedback.

41. The HVAC system of claim 34, wherein the electric motor is an induction motor.

42. The HVAC system of claim 34, wherein the electric motor drives the blower assembly to move a first volume of air per minute in the first mode and a second volume of air per minute in the second mode, and wherein the first and second volumes of air are different.

43. The HVAC system of claim 34, wherein the first speed connection comprises a standard speed connection and the second speed connection comprises an alternative speed connection.

44. A heating, ventilation, and air conditioning (HVAC) system comprising:

a controller configured to provide a first power and a second power;

an electric motor electrically coupled to and controllable by the controller, the electric motor including a housing, a first stator fixed relative to the housing and adapted to receive the first power, the first stator producing a first magnetic field when the first stator receives the first power, the first stator comprising a first speed connection and a second speed connection, the second speed connection being different than the first speed connection;

a second stator fixed relative to the housing and adapted to receive the second power, the second stator producing a second magnetic field when the second stator receives the second power, and a rotor including a shaft rotatable relative to the housing, a first rotating member connected to the shaft for rotation therewith and adapted to interact with the first magnetic field, and a second rotating member connected to the shaft for rotation therewith and adapted to interact with the second magnetic field, the rotor rotating at a first speed when the first magnetic field interacts with the first rotating member and rotating at a second speed when the second magnetic field interacts with the second rotating member; and a blower assembly drivingly coupled to the shaft to move a first volume of air per minute when driven at the first output speed and a second volume of air per minute when driven at the second output speed, the first and second volumes of air being different.

45. The HVAC system of claim 44, wherein the first stator includes a first number of poles, wherein the second stator includes a second number of poles, and wherein the first number is greater than the second number.

46. The HVAC system of claim 44, wherein the first speed connection comprises a standard speed connection and the second speed connection comprises an alternative speed connection.

47. The HVAC system of claim 46, wherein the standard speed connection includes a high speed connection and the alternative speed connection includes one of a medium speed connection and a low speed connection.

* * * * *